(12) United States Patent
Lundstrom et al.

(10) Patent No.: US 6,695,205 B1
(45) Date of Patent: Feb. 24, 2004

(54) INTEGRATED CIRCUIT CARD PROGRAMMING MODULES, SYSTEMS AND METHODS

(75) Inventors: Robert W Lundstrom, Plymouth, MN (US); Peter E Johnson, Brooklyn Park, MN (US)

(73) Assignee: DataCard Corporation, Minneapolis, MN (US)

( * ) Notice: Subject to any disclaimer, the term of this patent is extended or adjusted under 35 U.S.C. 154(b) by 47 days.

(21) Appl. No.: 09/667,342

(22) Filed: Sep. 22, 2000

Related U.S. Application Data

(60) Provisional application No. 60/155,730, filed on Sep. 23, 1999.

(51) Int. Cl.⁷ ................................................. G06K 5/00
(52) U.S. Cl. ...................... 235/380; 235/449; 235/487; 235/451; 235/493
(58) Field of Search .......................... 235/472.01, 380, 235/381, 475, 449, 479, 493, 487, 492, 451

(56) References Cited

U.S. PATENT DOCUMENTS

| | | | | |
|---|---|---|---|---|
| 4,106,062 | A | * | 8/1978 | Foote .......................... 235/449 |
| 4,825,054 | A | | 4/1989 | Rust et al. ................... 235/380 |
| 4,827,425 | A | * | 5/1989 | Linden ........................ 235/380 |
| 4,866,259 | A | | 9/1989 | Bonnemoy ................... 235/475 |
| 5,037,216 | A | | 8/1991 | Nubson et al. ............. 400/120 |
| 5,266,781 | A | | 11/1993 | Warwick et al. ............ 235/375 |
| 5,332,889 | A | | 7/1994 | Lundstrom et al. ......... 235/380 |
| 5,614,707 | A | | 3/1997 | Lundstrom et al. ......... 235/479 |
| 5,837,991 | A | | 11/1998 | LaManna et al. ........... 235/475 |
| 5,943,238 | A | | 8/1999 | Nioche et al. ......... 364/468.28 |
| 6,027,020 | A | | 2/2000 | Meyer-Wittreck et al. |
| 6,082,617 | A | * | 7/2000 | Meyer-Wittreck et al. .. 235/377 |
| 6,176,424 | B1 | | 1/2001 | Meyer-Wittreck et al. |
| 6,269,930 | B1 | | 8/2001 | Dorner |
| 6,283,368 | B1 | | 9/2001 | Ormerod et al. |
| 6,352,206 | B1 | * | 3/2002 | Ashley ........................ 108/43 |

FOREIGN PATENT DOCUMENTS

| | | |
|---|---|---|
| DE | 196 10 739 | 9/1997 |
| DE | 196 34 230 | 2/1998 |
| DE | 196 41 892 | 4/1998 |
| DE | 197 09 562 | 9/1998 |
| EP | 266 926 | 5/1988 |
| EP | 2 218 012 | 4/1998 |
| FR | 2 775 098 | 8/1999 |
| FR | 2 775 098 A1 | 8/1999 |
| JP | 6-203220 | 7/1997 |
| JP | 10-275201 | 10/1998 |
| WO | 89/07805 | 8/1989 |

OTHER PUBLICATIONS

Multi–Chip Digicard; Specifications and Multichip Scheme brochure; Oct. 1998.
DIGICARD; "The Future is in the Plastic Cards"; informational brochure and specifications (no date).

* cited by examiner

*Primary Examiner*—Michael G. Lee
*Assistant Examiner*—Steven S. Paik
(74) *Attorney, Agent, or Firm*—Merchant & Gould P.C.

(57) ABSTRACT

The invention relates to the programming of integrated circuit cards. More particularly, the invention concerns systems and methods for integrated circuit card programming, as well as modules used for integrated circuit card programming. Each module includes a movable cassette mechanism having a plurality of card programming stations thereon. The use of multiple card programming stations permits simultaneous programming of a plurality of cards. Further, the use of a single cassette in the module permits the size of the module to be reduced significantly. A modular concept is more readily adaptable to customer needs and requirements. For instance, if a customer requires more card production than that provided by a single module, a second module that is identical to the first module can be connected to the first module so that the two modules working together provide two cassettes. Additional modules can be added to further increase card production capacity.

12 Claims, 11 Drawing Sheets

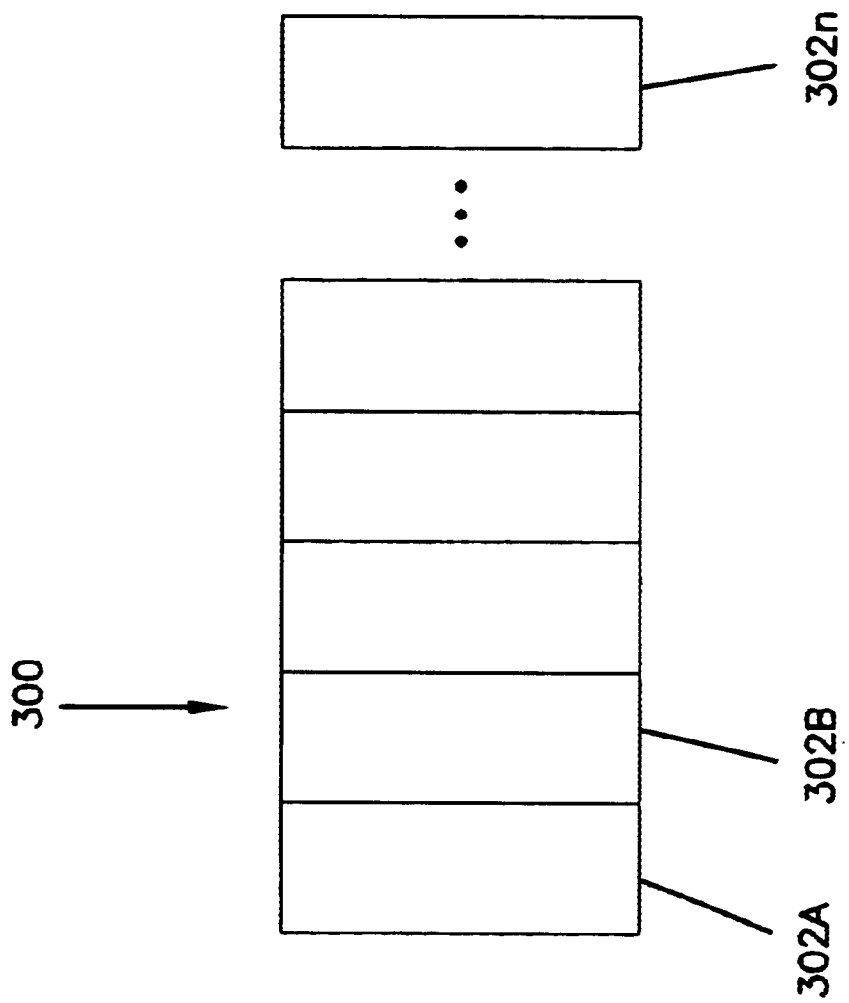

INTEGRATED CIRCUIT CARD PROGRAMMING MODULES, SYSTEMS AND METHODS

RELATED APPLICATION

This application claims the benefit of U.S. Provisional Application No. 60/155,730, filed Sep. 23, 1999.

FIELD

The invention described herein relates to the programming of integrated circuit cards. More particularly, the invention concerns systems and methods for integrated circuit card programming, as well as modules used for integrated circuit card programming.

BACKGROUND

Integrated circuit cards are often used as credit cards, identification cards, telephone cards, debit cards (i.e. electronic purses) and the like. Like a credit card, the integrated circuit card may have embossed letters, printing, or a magnetic stripe for data storage on its surface. The integrated circuit fulfills a similar purpose as the magnetic stripe, but generally has a greater capacity for storage of data and is a more stable storage medium. These advantages make it a more secure card than a magnetic stripe card.

Integrated circuit cards are requiring increasing capacities for data storage, thereby requiring long time periods to program. In order to program high-capacity integrated circuit cards at a high production rate, it is necessary to program many of them simultaneously while maintaining a continuous flow of non-programmed cards into the system and programmed cards out of the system. The longer the programming time, the greater the number of programming stations required to maintain high production rates. It is therefore a requirement of an integrated circuit programming system that it be able to contain a large number (e.g. thirty to sixty or more) programming stations into which cards are placed for programming and that these stations be contained in a small space. Since production volumes and program times are increasing, the device must be efficient with a small number of stations and be upgradable to a larger number of stations. It is a further requirement that integrated circuits be contacted on the front or the back (or both) of the card and that the device be easily configured for either position.

Prior circuit card programming devices, such as the ones disclosed in U.S. Pat. No. 5,943,238 to Nioche, U.S. Pat. No. 4,866,259 to Bonnemoy, and U.S. Pat. No. 4,827,425 to Linden do not provide a large number of programming stations in a small space. They also are not efficient with a small number of stations and upgradable to a larger number of stations. Furthermore, they are not easily configured for contacting integrated circuits on either the front or the back of the card.

SUMMARY

In the present invention, an integrated circuit programming module can contain a plurality of programming stations in a relatively small space for programming cards simultaneously. Multiple modules can also be used to increase the programming capacity further. For example, a production rate of approximately 3000 cards per hour can be achieved.

One aspect of the invention, as defined in the claims, concerns a card production system comprising a plurality of modules, with at least two of the plurality of modules comprising first and second integrated circuit card programming modules. The first and second integrated circuit card programming modules each include: a card path, a card transport mechanism for transporting a card along the card path, and a plurality of integrated circuit card programming stations movable relative to the card path.

Another aspect of the invention, as defined in the claims, concerns an integrated circuit card programming module that comprises a housing, a linear card path through the housing, a card transport mechanism for transporting a card along the linear card path, and a mechanism movably mounted in the housing for movement along an axis generally perpendicular to the card path. The mechanism includes a plurality of card programming stations mounted thereon and movable therewith along the axis and a pass-through location. The pass-through location permits cards to pass through the mechanism without programming.

Yet another aspect of the invention, as defined in the claims, comprises a method of programming an integrated circuit card. The method comprises providing an integrated circuit card programming module that includes a card path, a card transport mechanism for transporting a card along the card path, and a plurality of integrated circuit card programming stations movable along an axis that is generally perpendicular to the card path. The method also includes moving the integrated circuit card programming stations relative to the card path while non-consecutively loading integrated circuit cards into the card programming stations for subsequent programming.

These and various other advantages and features of novelty which characterize the invention are pointed out with particularity in the claims annexed hereto and forming a part hereof. However, for a better understanding of the invention, its advantages and objects attained by its use, reference should be made to the drawings which form a further part hereof, and to the accompanying description, in which there is described a preferred embodiment of the invention.

BRIEF DESCRIPTION OF THE DRAWINGS

FIG. 11 illustrates an integrated circuit card programming system utilizing one or more integrated circuit card programming modules.

DETAILED DESCRIPTION

Figure 1:
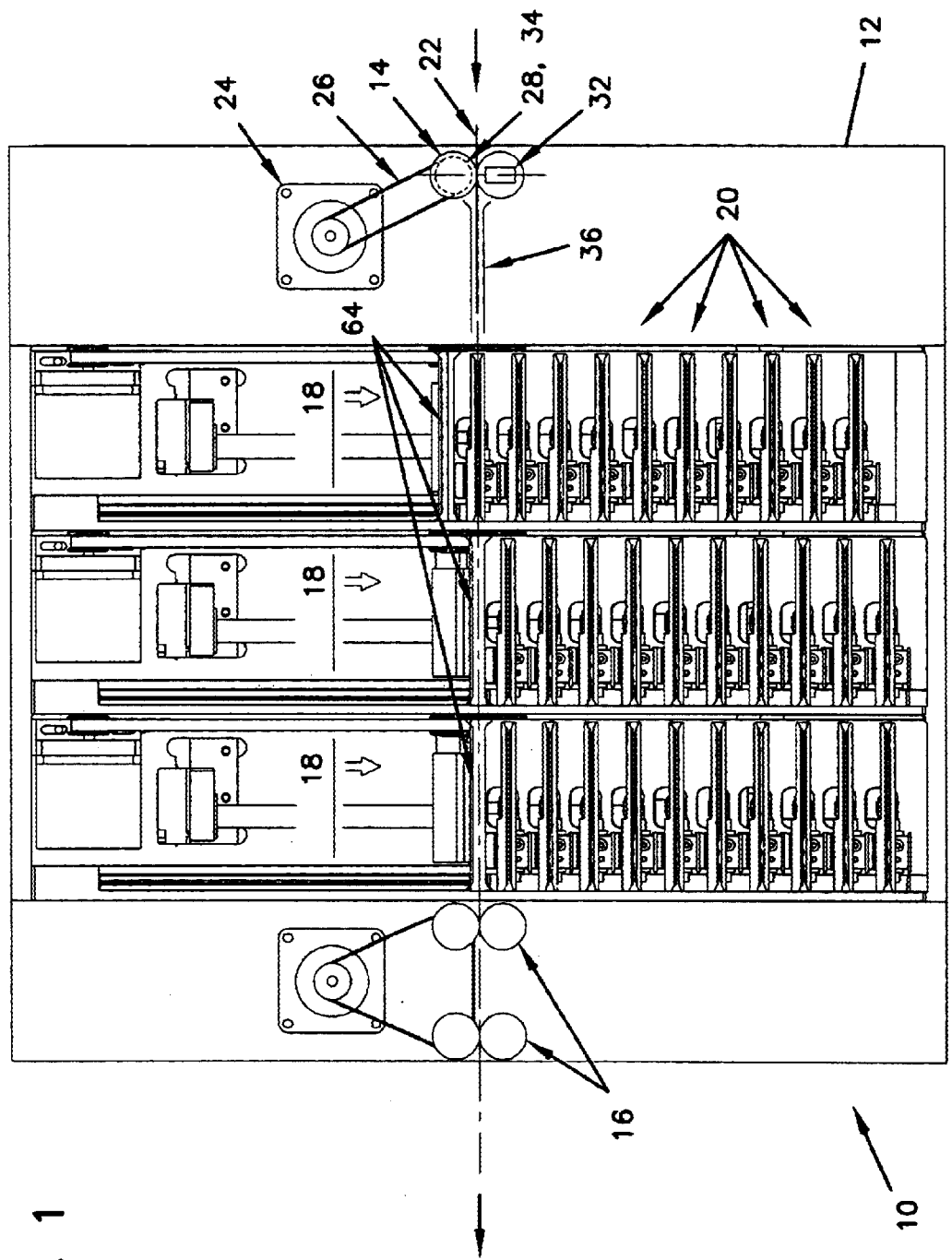
FIG. 1 is a top view of an integrated circuit card programming module in accordance with a first embodiment of the invention.

A first exemplary embodiment of an integrated circuit card programming module 10 will now be described with reference to FIGS. 1–6. The module 10 includes a housing 12, a pair of entry rollers 14, exit rollers 16, at least one magazine 18 containing a plurality of programming stations 20, and a card transport mechanism 21. In the illustrated embodiment, three identical magazines 18 are present within the housing 12. However, the module 10 can be used with a smaller or larger number of magazines in the housing.

As shown in FIG. 1, cards 22 enter the integrated circuit programming module into the pair of entry rollers 14. A stepper motor 24 drives the entry rollers 14 through a timing belt 26 and pulleys 28. The entry rollers 14 move the card 22 into position where a card carriage 30 associated with the card transport mechanism 21 captures it. An entry sensor 32 verifies that the card 22 has entered and is in position for capture by the card carriage 30. The entry rollers 14 have a one-way override clutch 34 that will slip if the card 22 is driven into the rollers faster than the rollers are being driven. Card guides 36 on the sides and bottom of the card are further provided downstream of the entry rollers 14 to contain the card 22 as it leaves the entry rollers.

Figure 2:
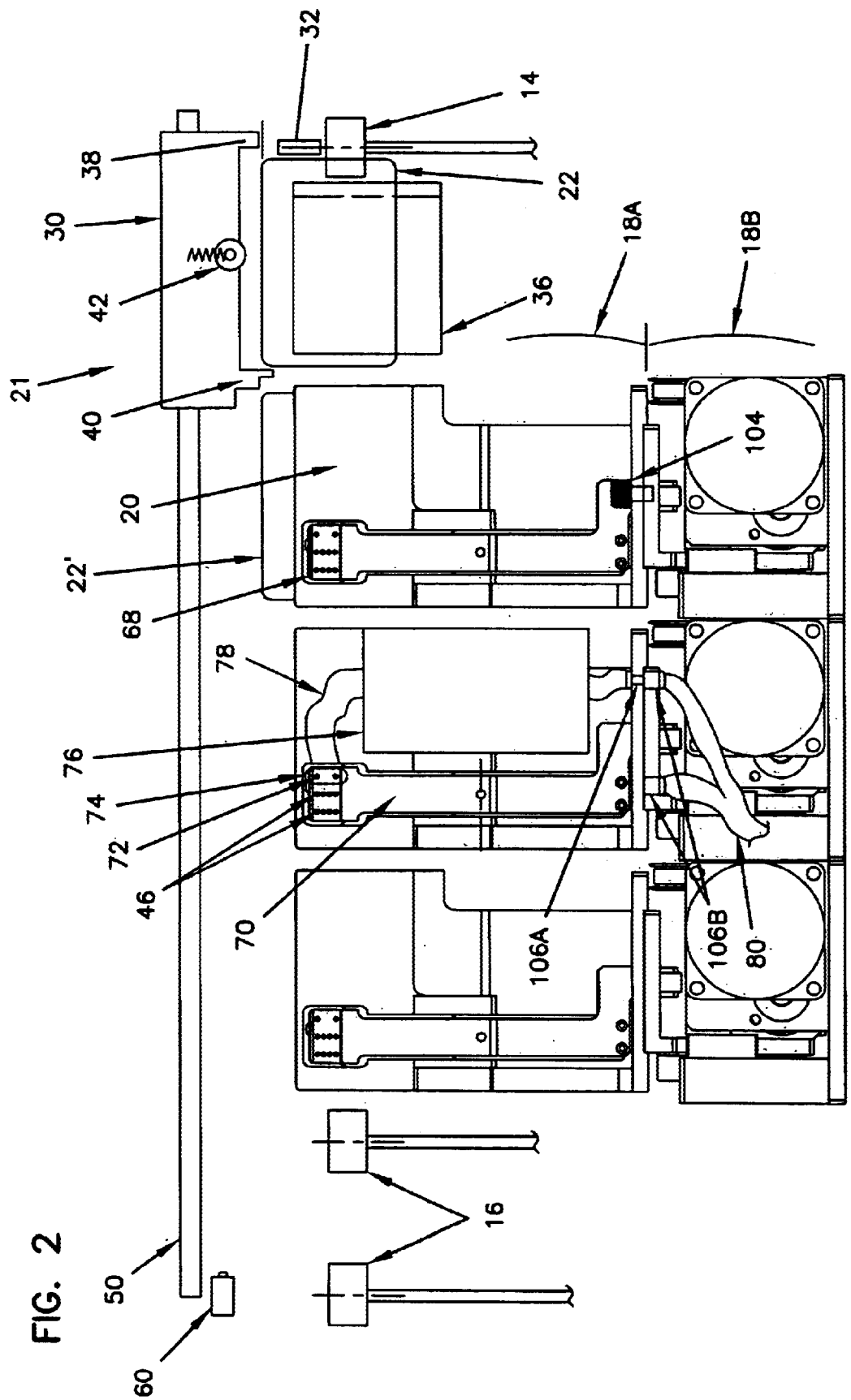
FIG. 2 is a front view of the integrated circuit card programming module, with the card carriage adjacent the entry rollers to pick up a new card.
Figure 3:
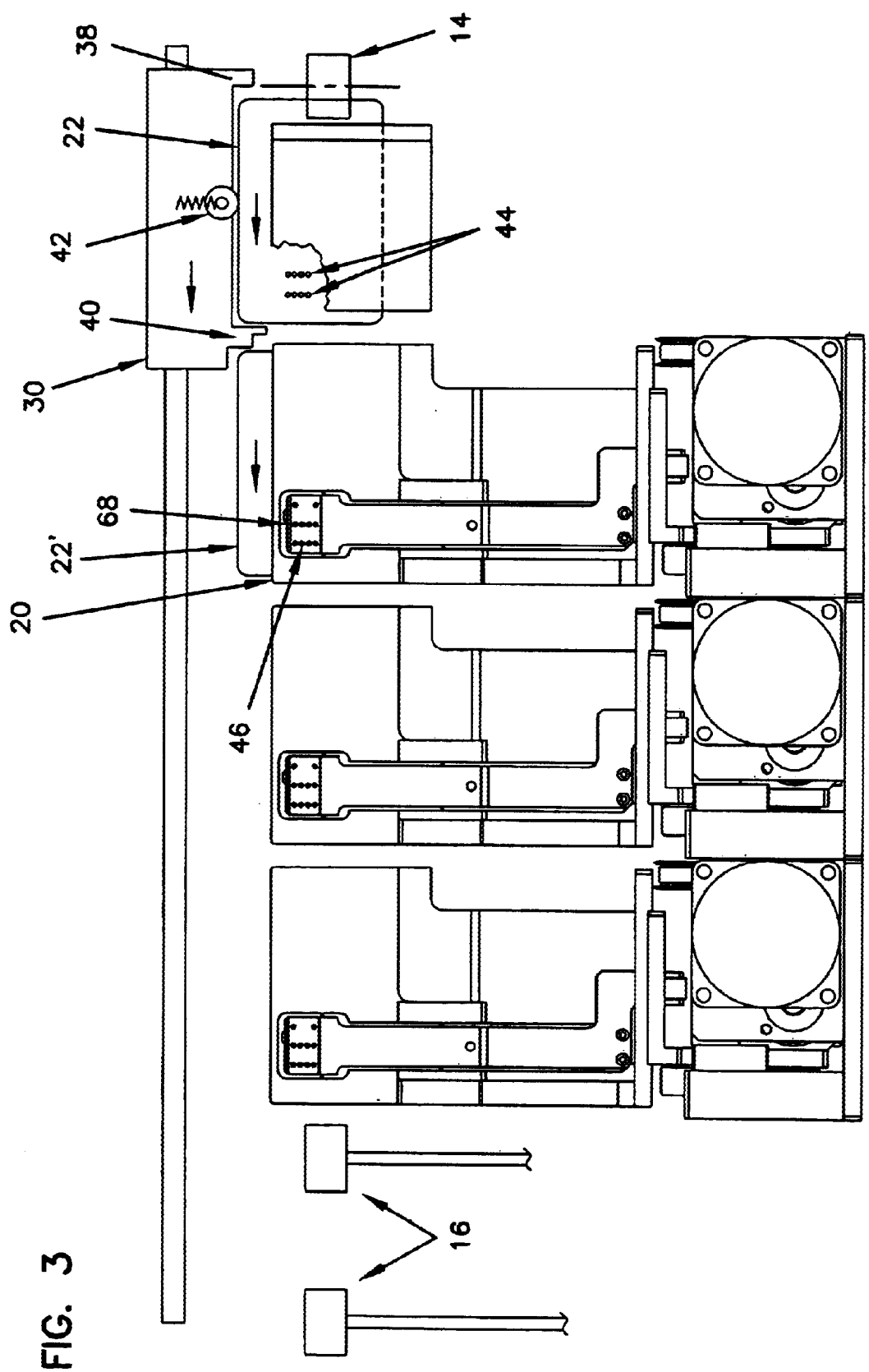
FIG. 3 is a front view similar to FIG. 2, but with the card carriage lowered into a transport position.
Figure 4:
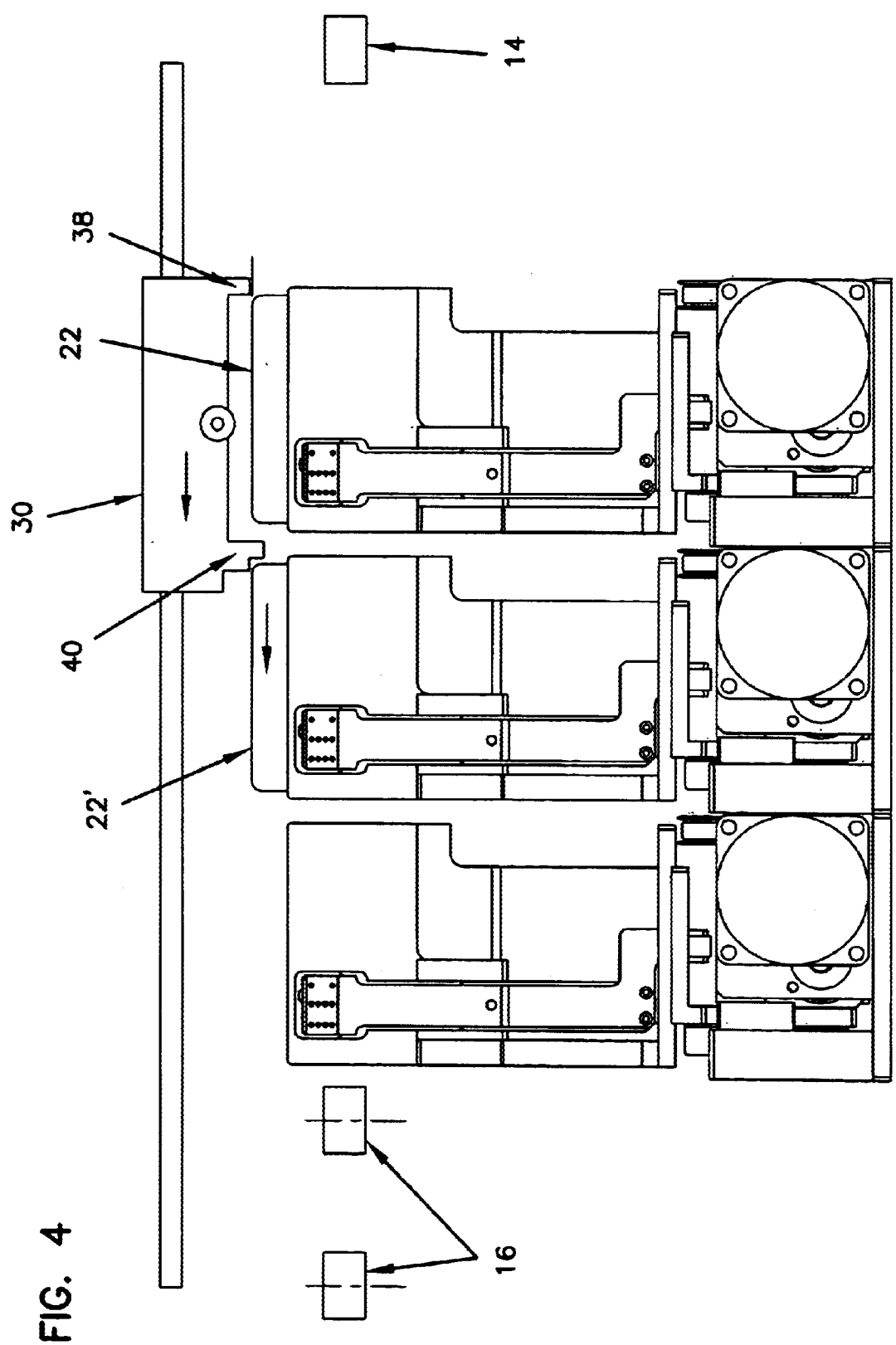
FIG. 4 is a front view similar to FIGS. 2 and 3, but with the card carriage moved to the left to transport the new card into a programming station and simultaneously push a programmed card from the programming station.

Referring to FIG. 2, cards are transported by the card transport mechanism 21, including the carriage 30, from the entry rollers 14 on the right, to the programming stations 20 in the magazines 18, and onto the exit rollers 16 on the left. The card path is preferably straight for simplicity and reliability. The card carriage 30 is located above the card 22 and has tabs 38, 40 sticking down to contact the card on both its right and left edges. The left tab 40 is longer than the right tab 38 so a card 22 can enter the carriage 30 under the right tab 38 and be stopped by the left tab 40.

When a new card is past the right tab 38, the card carriage 30 is dropped down (to the position shown in FIG. 3) so the right tab 38 captures it and transports it into a programming station 20. As the new card enters the programming station 20, the left tab 40 pushes out the old card 22' that is now completely programmed. The left tab 40 is cut out so a portion of the tab covers the top right corner of the programmed card 22' to prevent it from rising up as it is pushed.

The card carriage 30 includes a spring-loaded roller 42 centered above the card that is used to position the new card 22 precisely in the station 20. As the new card 22 is entering the station 20, the carriage 30 is moved down slightly so the roller 42 contacts the card and presses it firmly down onto the bottom of the station. As the card continues to enter the station, the friction between the station and the card is greater than the rolling friction of the spring-loaded roller so the card is seated firmly against the right tab 38.

When the new card completely enters the station, it is precisely located against the station bottom and the right carriage tab so integrated circuit pads 44 on the card 22 are lined up with electrical contact pins 46 associated with each programming station 20 which close and grip the card. The carriage 30 is then moved up (as in FIG. 4) so the right tab clears the top of the new card 22 but the longer left tab is still contacting the programmed card 22' that has been pushed out of the station. The card carriage 30 then pushes the programmed card 22' to the exit rollers 16 and returns to the entry for the next card. It will be appreciated that all card transport is provided by the single transport mechanism 21. The stations 20 themselves do not require any transport mechanism, simplifying their design, increasing their reliability, and decreasing their cost.

Figure 5:
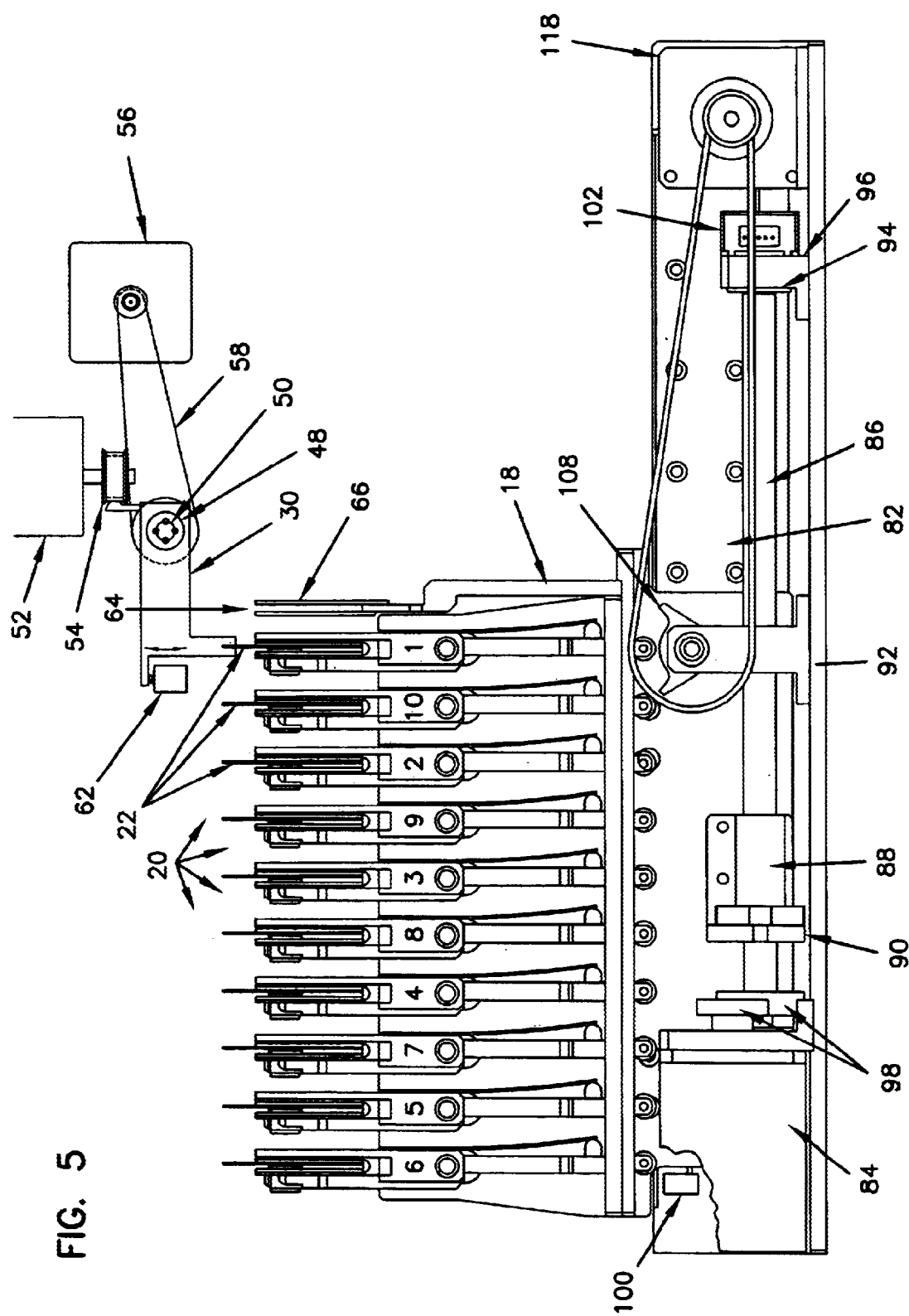
FIG. 5 is a right side view of the integrated circuit card programming module.

As shown in FIG. 5, the card carriage 30 mounts to a ball spline 48 that rolls along a mating splined shaft 50 to guide its motion from entry to exit. The splined shaft 50 controls carriage rotation around the shaft 50 as well as linear motion. The splined shaft 50 is mounted some distance behind the card path so when it is rotated slightly the carriage tabs move up or down to capture and drop off cards. A stepper motor 52 drives the carriage 30 during its linear motion from entry to exit through a belt and pulley arrangement 54. A stepper motor 56, and belt and pulley arrangement 58 also rotate the splined shaft 50 to provide vertical motion of the card carriage. Home sensors 60, 62 at one end of the linear and rotary travel paths provide reference points for travel in both axes of motion (FIGS. 2 and 5).

The programming stations 20 are mounted to moveable magazines 18 (FIGS. 1 and 5) that are movable front to back (i.e. perpendicular to the card path) to bring the stations 20 to the stationary card path. Preferably, one to three magazines are mounted in each module 10 and five to ten stations 20 are mounted in each magazine 18. The magazines 18 contain a pass-through slot 64 that allows cards to be passed through a magazine 18 while all stations 20 in that magazine are programming cards and another magazine downstream thereof is being used. The pass-through slot 64 consists of side and bottom card guides 66 that guide the card as the carriage 30 drives it through. If a magazine 18 is not installed (i.e. if one or more of the right, center or left magazine illustrated in FIG. 1 is not installed), a set of card guides must be installed which replicate the pass-through slot 64. When cards are being moved in and out of one magazine 18, the other magazine(s) 18 are positioned so their pass-through slot 64 is in the card path. Thus, multiple magazines 18 each multiple programming stations 20 are serviced by a single, straight-line transport mechanism 21 with no card transport mechanism in the programming stations 20 themselves.

Figure 6:
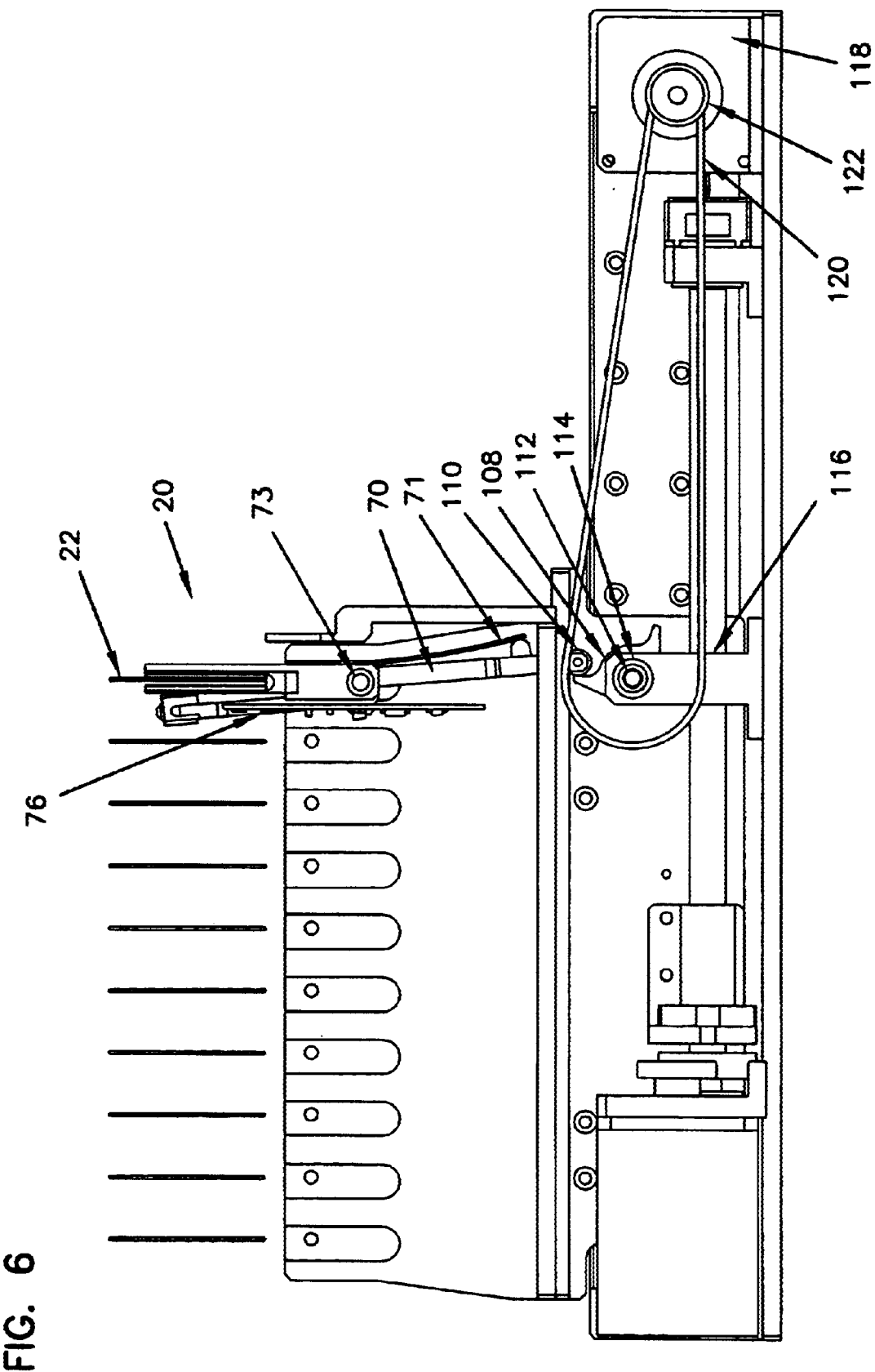
FIG. 6 is a view similar to FIG. 5, showing a programming station in a card receiving mode.

Referring to FIGS. 2 and 6, the programming stations 20 include a head 68 with eight spring-loaded electrical contact pins 46 (FIG. 2) to contact the integrated circuit pads 44 on the card. The head 68 is mounted on a pivoting arm 70 that is biased by a spring 71 about pivot 73 toward the card. A card sensor 72 in the station 20 senses that the card is in the station through the entire programming operation. The card sensor 72 comprises two additional contact pins in the head 68 and a conductive pad 72 located behind the card in the station. If a card is present, the pins of the card sensor 72 rest on it, and since the card is made of non-conductive plastic, there is no continuity between the sensor pins. If no card is present, the arm 70 is biased such that the two sensor pins contact the conductive pad 74, thereby providing continuity between the pins. In this way the conductivity between the two sensor pins provides an indication of whether a card is in the station or not.

The electronics 76 that store the data to be programmed and communicate with the card are contained next to the programming stations 20. Short flexible cable assemblies 78 connect the electronics 76 in the magazine to the contact heads 68. A long flexible cable assembly 80 connects the electronics 76 with the main control circuit board mounted nearby. This is one of many programming station designs that would work with this invention.

As shown in FIG. 5, the entire magazine 18 mounts to a precision linear guide assembly 82 that guides its motion perpendicular to the card path. A stepper motor 84 drives the magazine 18 back and forth through a lead screw 86. A lead screw nut 88 is mounted to the magazine via a bracket 90, and the lead screw 86 mounts to a module frame 92 through bearings 94 and brackets 96 on each end of the lead screw. A gear pair 98 connects the lead screw 86 to the motor 84 to provide a suitable drive ratio. A home position sensor 100 senses when the magazine 18 is at one end of its travel and a rotary encoder 102 on the lead screw 86 verifies the position of the magazine 18 at any location away from the home sensor 100.

Integrated circuit cards being used today may have the contact pads 44 located on the front or backside of the card. To allow the operator of the module to configure a module 10 for either front or back side programming, the top half 18A of the magazines containing the programming stations 20 and electronics 76 may be rotated 180 degrees to a front or back positions (see FIG. 2). The bottom half 18B of the magazine containing the linear slide and drive mechanisms is not moved. Precision locating features between the top and bottom halves 18A, 18B of the magazine position the stations 20 in the same position relative to the home sensor 100 so no adjustments are necessary when changing from front to back. Also, thumbscrew 104 attach the top and bottom halves 18A, 18B of the magazine so an operator can make changes without using tools. An electrical connector 106A on the top half 18A of the magazine mates to one of two matching connectors 10B on the bottom half 18B of the magazine depending on whether the magazine is configured for front side or back side programming. This automatically disconnects and reconnects the electronics without dangling wires when the top half 18A of the magazine is rotated around. A sensor (not illustrated) is preferably provided in the magazine 18 to indicate whether it is configured for front or backside programming. Furthermore, programming jobs with short programming times do not require that all magazines be used, so if more than one magazine is installed, one or two magazines can be configured for front programming and the other(s) can be configured for back programming. The controller will use the appropriate magazine for the cards being programmed so no operator intervention is required when changing between front and backside programming for these jobs.

As shown in FIG. 6, the programming stations 20 are opened by a cam 108 that contacts a roller 110 on the station arm 70 insert and remove cards. One cam 108 is required per programming station magazine. The cam 108 is attached to a shaft 112 that rotates in bearings 114 mounted in a bracket 116 on the module frame 92. The cam mechanism is located under the card path to open whichever station is centered in the card path. The arm roller 110 is centered in the magazine and the cam 108 can push the arm roller 110 either direction. Thus, when the magazine 18 is moved for front or backside programming, the same cam 108 can open the stations 20 without adjustment by simply rotating in the opposite direction. A stepper motor 118 drives the cam 108 through a belt 120 and pulleys 122 (the pulley connected to the cam 108 is not illustrated for sake of clarity). FIG. 6 shows the programming station being opened by the cam, while FIG. 5 shows the station closed and the cam 108 in its neutral position.

With this embodiment, station opening is independent of magazine motion, so programming stations may be loaded in any order. This is important to maintain high production rates because the magazine is relatively heavy so long moves are slow. To maintain high production rates in a system with other processing modules, each card cycle time must be approximately equal and as short as possible. To eliminate long moves, the stations are loaded every other one starting near the pass-through slot and moving away as shown by the numbering of the stations 20 in FIG. 5. They are then loaded every other one coming back toward the pass-through slot 64 so no move has been longer than a two-station distance. If the stations 20 were loaded consecutively, a long magazine move would be required to move from the last station back to the first. Thus, the independent operation of the programming stations 20 allows loading in a non-consecutive manner, thereby eliminating long magazine moves and providing high production rates.

Another advantage of this embodiment is that loading of stations 20 is not affected by programming time because card programming in the stations is independent of card transport through the module 10. In fact, there is no need to predetermine the programming time before starting to load the programming stations 20. Cards are loaded in each station of one magazine at the maximum cycle rate of the module until that magazine is full. If programming of the first card is complete before the magazine is fully loaded, the rest of the stations can be loaded with cards anyway to bring the magazine back to the first station without making long, time consuming moves. Therefore, when the first magazine is fully loaded with cards:

1. If the first card has completed programming, additional cards will be loaded in the first magazine only, replacing cards in the order they came in, after they are complete. In this instance, only one magazine will be used regardless of how many are installed, so programmed cards reach the output as quickly as possible.
2. If the first card hasn't completed programming and another magazine is installed, cards will be sent to the second magazine until it is full. If the first card in the first magazine is still not complete and a third magazine is installed, cards will be sent to it. In a modular arrangement, i.e. when a pluarlity of modules 10 are used together, if a second module is installed, it will be used if the first card is not complete when all stations in the first module are full. Once the first card is complete, the magazine being filled will be completely filled and no additional magazines will be used.
3. If all stations installed in the machine are filled before the first card is complete, the machine will pause until the first card is complete, then cards will be replaced in the order they came in, as they are complete.

An exemplary, detailed operational sequence for loading a single card is shown in Chart A. Approximate times required for each step to achieve a 3000 card per hour production rate are also given.

CHART A

Integrated Circuit Card Module Operational Sequence For
Embodiment Shown In FIGS. 1–6
(All times and distances are approximate)

When loading cards in/out of the Magazine closest to the entry rollers:

1. Transfer card in/out of module. (Rollers @ 2100 step/sec, 3 in. travel) — 0.100 sec
   At same time, open station arm. (1000 step/sec) (0.100 sec)
2. Move card through entry rollers into carriage. — 0.040 sec
   (Rollers @ 2100 step/sec, 1.0 in. travel)
3. Drop carriage down onto card to capture trailing edge. — 0.060 sec
4. Move carriage to station, push old card out as new enters. — 0.140 sec
   (4.0 in. @ 2500 step/sec)
   Drop carriage to spring load card down, after lead edge in magazine. (0.050 sec)
5. Close station arm. — 0.100 sec
6. Lift carriage up off card in station. — 0.070 sec
7. Move carriage to exit pushing old card into rollers. — 0.180 sec
   (5.5 inches @ 2500 step/sec)
   Move magazine to next station. (1.8 inch move @ 2000 step/sec) (0.265 sec)
8. Lift Carriage to clear magazine during return. — 0.050 sec
   (This is also carriage settle time.)
9. Return carriage to entry. (9.5 inches @ 2500 step/sec) — 0.300 sec
   Move card to exit. (Rollers @ 20 in/sec, 3.5 in travel) (0.180 sec)
   If next card goes into next adjacent magazine, move adjacent magazine to its first station. (0.145 sec)
10. Drop carriage down to position to receive new card. — 0.060 sec 1.100 sec

When loading cards in/out of next adjacent Magazine:

1. Transfer card in/out of module. (Rollers @ 2100 step/sec, 3 in. travel) — 0.100 sec
   At same time, open station arm. (1000 step/sec) (0.100 sec)
2. Move card through entry rollers into carriage. — 0.040 sec
   (Rollers @ 2100 step/sec, 1.0 in. travel)
3. Drop carriage down onto card to capture trailing edge. — 0.060 sec
4. Move carriage to station, push old card out as new enters. — 0.255 sec
   (8.0 in. @ 2500 step/sec)
   Drop carriage to spring load card down, after lead edge in 1st magazine. (0.050 sec)
5. Close station arm. — 0.100 sec
6. Lift carriage up off card in station. — 0.070 sec
7. Move carriage to exit pushing old card into rollers. — 0.070 sec
   (1.5 inches @ 2500 step/sec)
   Move 2nd magazine to next station. (1.8 inch move @ 2000 step/sec) (0.265 sec)
8. Lift Carriage to clear magazine during return. — 0.050 sec
   (This is also carriage settle time.)
9. Return carriage to entry. (9.5 inches @ 2500 step/sec) — 0.300 sec
   Move card to exit. (Rollers @ 20 in/sec, 3.5 in travel) (0.180 sec)
   If next card goes in 3rd magazine, move 3rd magazine to its first station after (0.145 sec)
   the card has been moved to the exit.
10. Drop carriage down to position to receive new card. — 0.060 sec 1.105 sec

When loading cards in/out of 3rd Magazine:

1. Transfer card in/out of module. (Rollers @ 2100 step/sec, 3 in. travel) — 0.100 sec
   At same time, open station arm. (1000 step/sec) (0.100 sec)
2. Move card through entry rollers into carriage. — 0.040 sec
   (Rollers @ 2100 step/sec, 1.0 in. travel)
3. Drop carriage down onto card (position 3) to capture trailing edge. — 0.060 sec
4. Move carriage to station, push old card out as new enters. — 0.340 sec
   (12.0 in @ 2500 step/sec)
   (Must slow down just prior to entering station 3 so exiting card enters
   exit rollers slower than exit rollers running at 20 in/sec.)
   Drop carriage to spring load card down (position 4), after leading edge is in (0.050 sec)
   3rd magazine but before carriage is fully in station.
5. Move card to exit. (Rollers @ 20 in/sec, 0.25 in travel) (0.020 sec)
   Close station arm. — 0.100 sec
6. Lift carriage up completely (home position) to clear station. Check vertical home. — 0.070 sec
7. Return carriage to entry. (12.0 inches @ 2500 step/sec). Check horizontal home. — 0.340 sec
   Move 3rd magazine to next station. (1.8 inch move @ 2000 step/sec) (0.265 sec)
   If next card goes in 1st magazine, move 1st magazine to its first station. (0.145 sec)
8. Drop carriage down (to position 2) to receive new card. — 0.060 sec 1.110 sec It should be realized that loading sequences other than that shown in Chart A can be used, particularly if a production rate other than 3000 card per hour is required. Moreover, if a different production rate is desired, the times given will also vary.

Although this embodiment describes a design with three magazines and ten stations per magazine, it can be appreciated that a larger module could contain more than 10 stations per magazine and more than 3 magazines. The principles of design and operation would remain the same. Also, the pass through slot is described as being at one end of the magazine for simplicity. However, it could be located in the middle of the magazine to minimize the number of stations that must be filled before coming back to the first station. For very short programming times, this would minimize the time spent filling the first magazine before the first card can be sent to the exit. Furthermore, this invention describes a card carriage located above the card with tabs that engage the card using vertical motion. An alternative would be to provide a carriage off to the side of the card with tabs that move horizontally to engage and disengage the card. Other card transport mechanisms could be used as well.

Figure 7:
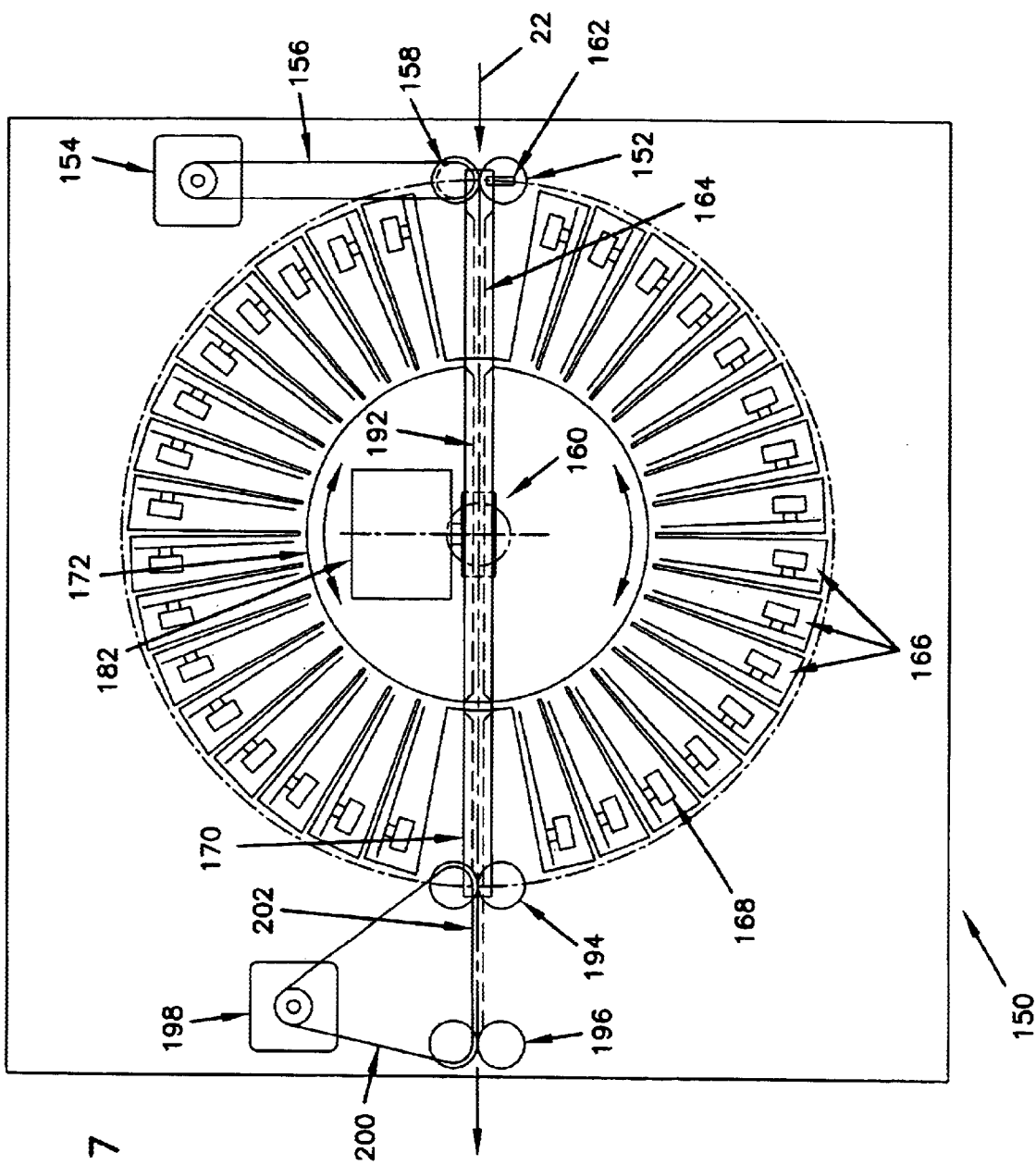
FIG. 7 is a top view of an integrated circuit card programming module in accordance with a second embodiment of the invention.

A second exemplary embodiment of an integrated circuit card programming module 150 will now be described with reference to FIGS. 7, 8, 9A and 9B. As shown in FIG. 7, non-programmed cards 22 enter the integrated circuit programming module 150 from the right into a pair of entry rollers 152. A stepper motor 154 drives the entry rollers through a timing belt 156 and pulleys 158. The entry rollers 152 move the card into position where a card transport system 160 captures it. An entry sensor 162 verifies that the card 22 has entered and is in position for the card transport 160. As in the embodiment in FIGS. 1–6, the entry rollers 152 have a one-way override clutch that will slip if the card is driven into the rollers faster than the rollers are being driven. Card guides 164 on the sides and bottom of the card are further provided to contain the card 22 as it leaves the entry rollers 152 and enters the card transport system 160.

The programming stations 166 are located radially around the outside of the card transport system 160 which is rotatable. The stations 166 are fixed in location so high-speed data transmission wiring to the stations 166 does not move or flex while cards are being programmed. They include a contact head 168 that contacts the integrated circuit on the card to communicate with it and hold the card in position while it is being programmed. The stations 166 are independent of each other and of the card transport system 160 so the module functions properly with between two and thirty stations installed. A small number of stations 166 are adequate for short programming times, and the system may be upgraded with more stations if long programming times are required.

Figure 8:
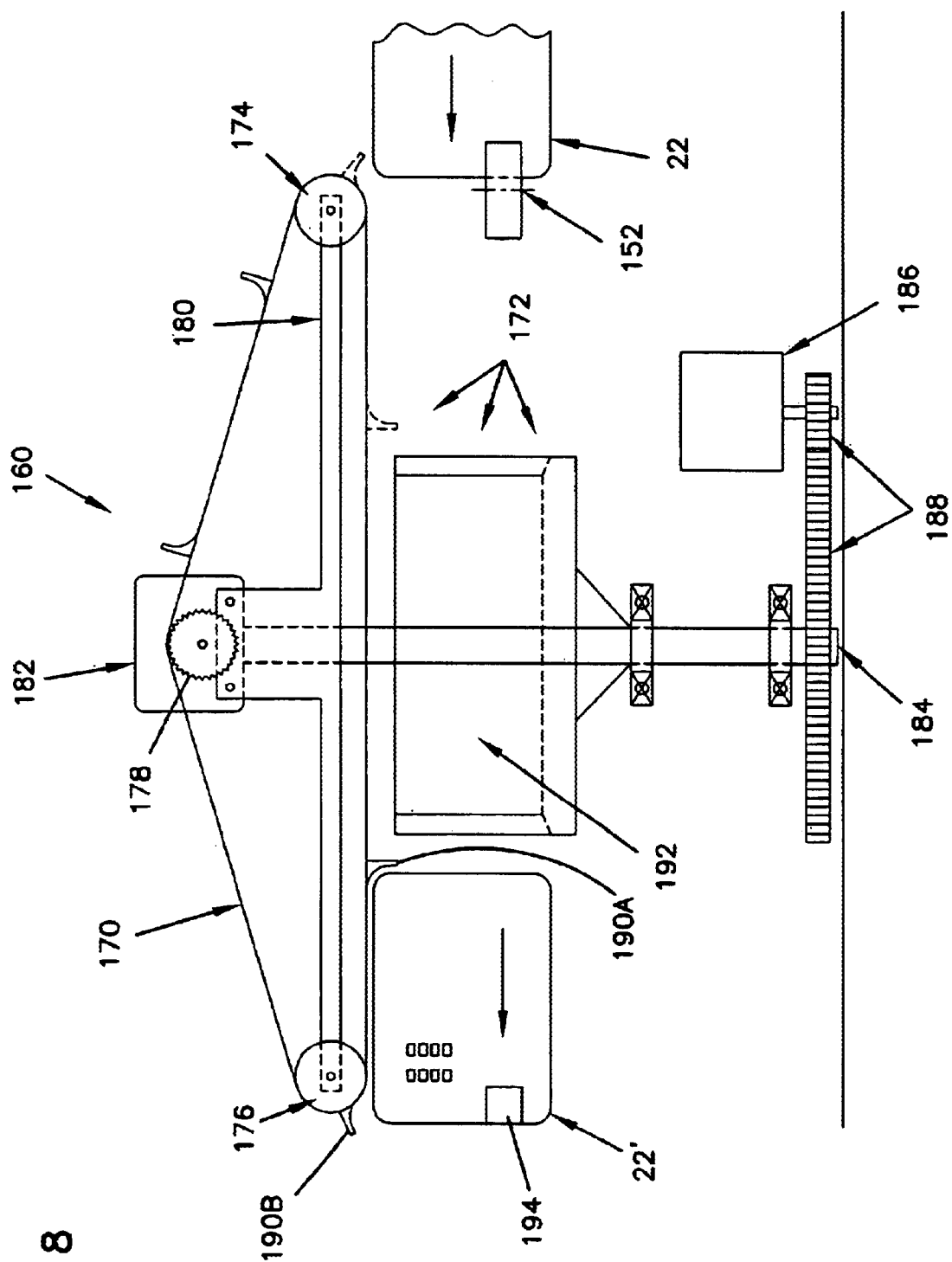
FIG. 8 is a front view of a card transport apparatus utilized in the embodiment shown in FIG. 7.

The card transport system 160, shown in FIG. 8, includes a card transport belt 170 mounted on a rotating turret 172, which is located in the center of the module 150. The transport belt 170 is above the card path and wraps around idler pulleys 174, 176 near the entry and exit as well as the motor driven pulley 178 up high near the center. A support bracket 180 mounts a motor 182 and idler pulleys 174, 176 and attaches to a vertical turret pivot shaft 184. A stepper motor 186 is able to rotate the pivot shaft 184 through a pair of gears 188.

The card transport belt 170 has tabs 190a, 190b that extend down to contact the left and right upper corners of the card 22. As the card passes through the entry rollers 152, the right tab 190a is wrapped around the entry idler pulley 174 above the card path so the card passes under it. The left tab 190b is beyond where the card will be when the entry rollers 152 have driven it as far as they can. When the card leaves the entry rollers 152, it also clears the entry sensor 162 (FIG. 7). The belt 170 is then driven so the right tab 190a comes around the pulley 174 and contacts the card pulling it into the rotating turret 172. The turret 172 has side and bottom card guides 192 to contain the card. When the card is in the turret 172, the turret is rotated to line up with an empty programming station 166. The belt 170 is driven to move the card fully into the programming station where the contact head 168 is closed onto the card to hold it. The turret 172 is then rotated to the next station where a fully programmed card 22' is ready to be removed. The belt is reversed 170 and the left tab 190b contacts the programmed card, pulling it into the turret 172. The turret 172 is then rotated to the exit and the belt is reversed again so the right tab 190a drives the card to the exit.

The programming stations do not need card transport capability of their own because the transport belt 170 on the turret is long enough to deliver cards fully into and remove cards from the programming stations. This simplifies the design of the stations, increasing their reliability and decreasing their cost. The card transport system 160 is designed with its mass located near the center pivot 184 so rotary moves are very quick. In addition, the card transport belt 170 is light so linear card moves are also fast.

At the exit, a first pair of exit rollers 194 receives programmed cards 22' from the transport belt 170. The cards are moved to a second pair of exit rollers 196 where it clears the transport belt tabs 190a, 190b. The transport belt is then moved to position the belt tabs to receive a new card. Two sets of belt tabs 190a, 190b are used to minimize travel needed to get the belt into position. A stepper motor 198 drives both sets of exit rollers 194, 196 through a belt and pulley arrangement 200. Side and bottom card guides 202 contain the card as it leaves the turret 172 and enters the exit rollers 194, 196. When the module 150 is ready to transfer cards into the next module, the card exits to the left and a new card comes in from the right as viewed in FIG. 7.

Figure 9A:
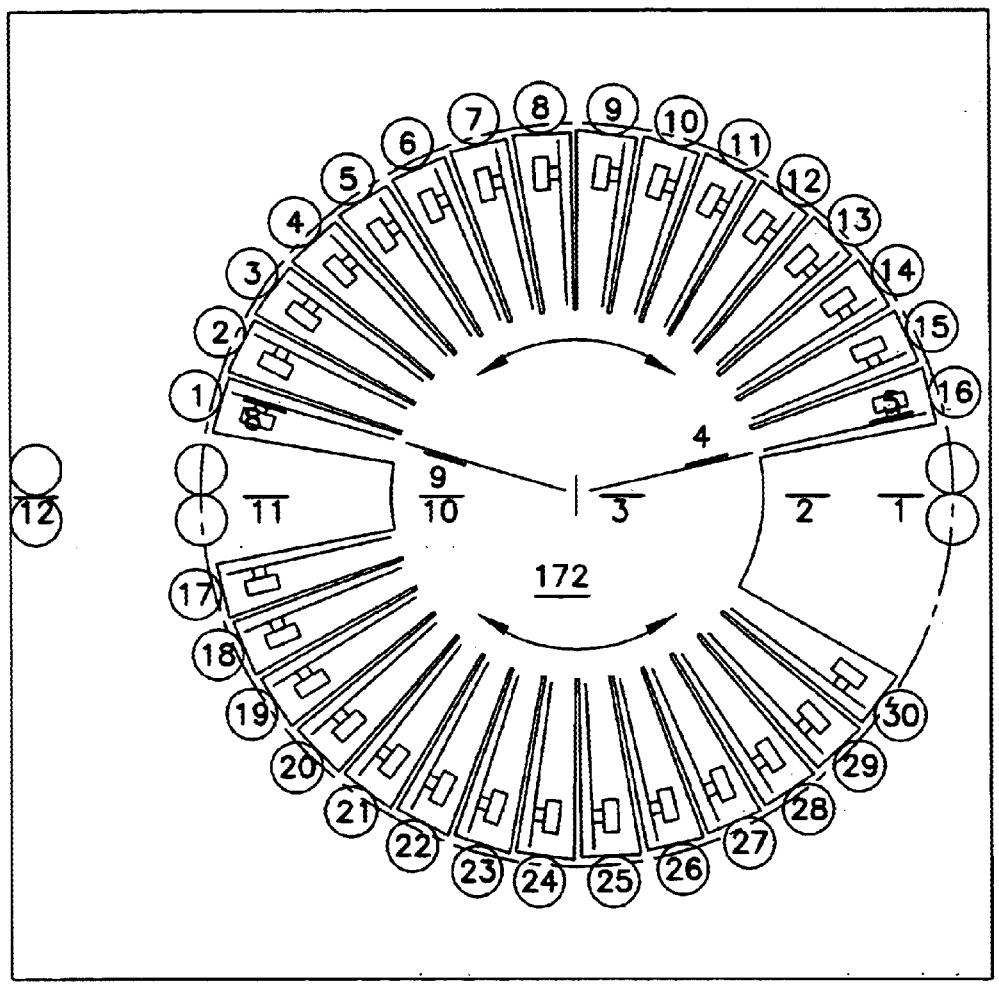
FIGS. 9A and 9B are top and front views, respectively, illustrating an exemplary operational sequence for the embodiment shown in FIG. 7.
Figure 9B:
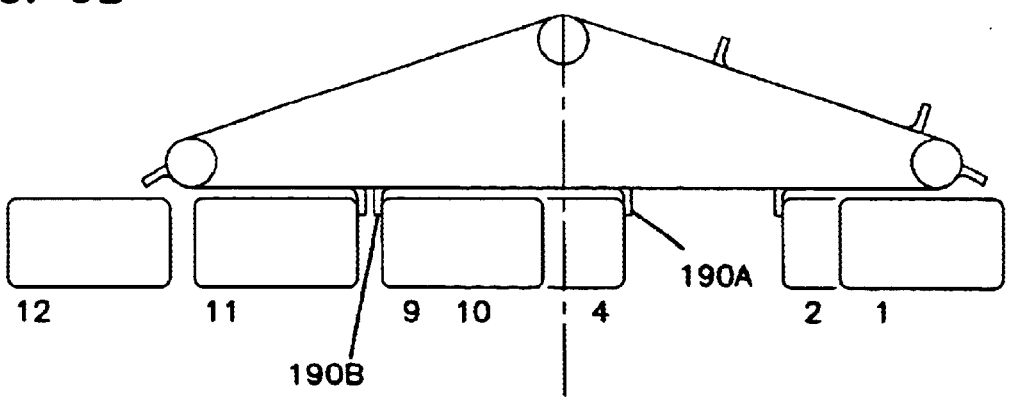

An exemplary, detailed operational sequence for loading one card in this embodiment is shown in Chart B, with reference to FIGS. 9A and 9B. Approximate times required for each step to load the worst case station and achieve a 3000 card per hour production rate are also given.

CHART B

Integrated Circuit Card Module Operational Sequence For Embodiment Shown in FIGS. 7, 8, 9A and 9B
Loading Station 16, Unloading Station 1
(All times and distances are approximate)

| | | |
|---|---|---|
| 1. Transfer card into module. (Rollers @ 30 in/sec, 3 in) | | .100 sec |
| 2. Move card past input rollers. (Rollers @ 30 in/sec, 1.5 in) | | .060 sec |
| 3. Move card into center turret. (Belt tab @ 50 in/sec, 4 in) | | .100 sec |
| 4. Rotate turret 170° to station 16. | | .210 sec |
|    Position card so leading tab @ edge of turret. | (.130 sec) | |
|    Actuate station 16 solenoid | (.100 sec) | |
| 5. Move card into station 16. (Belt tab @ 50 in/sec, 4.5 in) | | .110 sec |
| 6. Release station 16 solenoid | | .050 sec |
| 7. Move belt tab to clear cards. (Belt tab @ 50 in/sec, 0.25 in) | | .020 sec |
| 8. Rotate turret 1600 to station 1. | | .200 sec |
|    Actuate station 1 solenoid | (.100 sec) | |

CHART B-continued

Integrated Circuit Card Module Operational Sequence For Embodiment
Shown in FIGS. 7, 8, 9A and 9B
Loading Station 16, Unloading Station 1
(All times and distances are approximate)

| | | |
|---|---|---|
| 9. Move card into center turret. (Belt tab @ 50 in/sec, 4 in) | | .100 sec |
| 10. Rotate turret 10° to neutral | | .030 sec |
| Release station 1 solenoid (If no card coming?) | (.050 sec) | |
| 11. Move card to exit rollers. (Belt tab @ 50 in/sec, 4 in) | | .100 sec |
| 12. Move card to exit. (Rollers @ 30 in/sec, 3.5 in) | | .100 sec |
| Position belt tab for next card. | (.090 sec) | |
| | | 1.180 sec |

It should be realized that loading sequences other than that shown in chart B can be used, particularly if a production rate other than 3000 card per hour is required. Moreover, if a different production rate is desired, the times given will also vary.

FIGS. 9A and 9B show the approximate card location in numerical sequence after most of the twelve steps in Appendix B for the case of a card being loaded into station 16 and removed from station 1.

Integrated circuit cards being used today may have the contact pads located on the front or backside of the card. The programming station heads 168 are located to contact the front side of the card when the card transport system 160 is rotated clockwise to stations 1 through 16 (FIGS. 9A and 9B) and counterclockwise to stations 17 through 30. For contacting the backside of the card, the rotating turret 172 is simply rotated in the opposite direction and the transport belt 170 is driven the opposite direction. Since the transport belt has tabs 190a, 190b to contact both sides of the card, it can load and remove cards by moving either direction. In this way, integrated circuit cards with contacts on either the front or backside may be programmed with no operator intervention to reconfigure programming stations.

Another advantage of this embodiment is that programming stations 166 can be loaded and unloaded in any order and at any time, because card programming in the stations is independent of card transport through the module. There is no need to predetermine the programming time before starting to load the programming stations. At the start of a programming job, cards are loaded into stations at the maximum cycle rate of the machine until all stations are full or until programming of the first card is complete. Once programming of the first card is complete, it is moved to the exit and cards are cycled through a minimum number of stations from that point on. If programming times are short, only a few stations are loaded and the first programmed card reaches the exit as quickly as possible. This minimizes the time required to load the module and get the first card out at the start of a job. At any time, if no cards are complete, incoming cards may be loaded into unused stations until all stations installed in the module are full. If more than one module is installed in a machine, incoming cards may be passed on to succeeding modules until programming of a card is complete.

Although this invention describes a design with 30 programming stations in a module having a size approximately 20×20×15 inches, it can be appreciated that a larger module could contain more stations. The principles of design and operation would remain the same.

Figure 10:
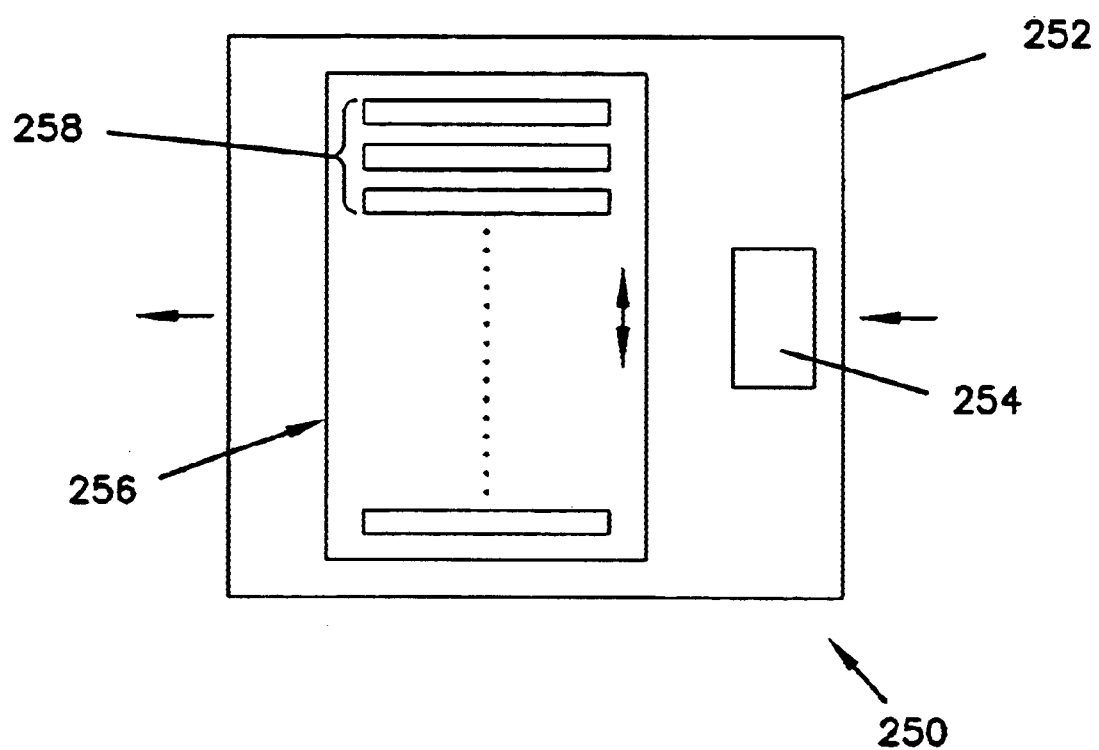
FIG. 10 is a schematic illustration of another embodiment of an integrated circuit card programming module according to the invention.

Another embodiment of an integrated circuit card programming module 250 is illustrated in FIG. 10. The module 250 includes a housing 252, entry rollers 254, and a single cassette 256 with a plurality of programming stations 258. The entry rollers 254 are similar to the entry rollers 14 described in connection with FIGS. 1–6 and are therefore illustrated schematically. In addition, the cassette 256 and stations 258 are generally similar to the cassette 18 and stations 20 described in connection with FIGS. 1–6 and are therefore illustrated schematically. The module 250 is illustrated without exit rollers. However, it is to be realized that the module 250 could be used with exit rollers, as in the embodiment shown in FIGS. 1–6. The use of exit rollers is determined, in part, by whether the transport mechanism associated with the module is constructed so as to be able to transport a card out of the module 250. The module 250 preferably uses the transport mechanism 21 described in relation to the embodiment shown in FIGS. 1–6 for moving the cards within the module 250. Other transport mechanism designs could be used as well.

The cassette 256 and stations 258 are described as being generally similar to the cassette 18 and stations 20 in FIGS. 1–6. However, one difference is that the pass-through slot is replaced by a card programming station 258 which increases programmed card volume of the module 250. As in a pass-though slot, a programming station 258 allows a card to pass therethrough, either without programming of a card or subsequent to card programming. Any one of the stations 258 is able to act as the pass through slot, and the station 258 that is operating as the pass through slot actually varies during operation. Pass through occurs when the programming head on the particular station 258 is actuated to an open position, and the transport mechanism delivers the card to and through the station without the programming head closing. However, it is to be realized that the cassette 256 could utilize a pass-through slot as in FIGS. 1–6.

The use of a single cassette 256 in the module 250 permits the size of the module to be reduced significantly. Further, a modular concept using the module 250 is more readily adaptable to customer needs and requirements. For instance, if a customer requires more card production than that provided by the module 250 with a single cassette 256, a second module that is identical to the module 250 can be connected to the module 250 so that the two modules working together provide two cassettes. Additional modules can be added to further increase card production capacity. As indicated above, the transport mechanism used determines whether exit rollers are used or not. When exit rollers are not used, the entry rollers 254 of a downstream module function as exit rollers for the adjacent upstream module. On the other hand, if the production of a single cassette 256 is adequate, a single module 250 can be used.

This modular system concept is better understood with reference to FIG. 11 which illustrates therein a card production system 300 comprising a series of interconnected modules 302a, 302b, . . . 302n. The modules 302a, b . . . n comprise one or more of the integrated circuit card programming modules 250 described in FIG. 10, in combination with one or more other card handling or card processing modules generally known in the art. The modules are electrically connected to each other, and communicate with a central controller, in the manner disclosed in U.S. Pat. No. 5,588,763.

One configuration of the system 300 could be the use of one integrated circuit card programming module 302b (equivalent to the module 250, or even the module 10), a card input hopper module 302a feeding cards to the module 302b, one or more card processing modules (e.g. embossing, printing, laminating, etc.) downstream from the module 302b, and a card output hopper 302n collecting programmed and processed cards as well as storing improperly programmed and/or processed cards. For larger card programming requirements, one or more of the additional modules could be integrated circuit card programming modules 250 or 10. In addition, a mailer module in which a programmed and/or processed card is attached to a mailer, as well as a module for inserting the mailer into an envelope for mailing, can be provided.

Therefore, as should be evident, the use of modules enhances adaptability to customer needs, as the system 300 can be configured to the current and future requirements of a customer by adding or removing one or more modules as necessary. Moreover, by adding or removing one or more integrated circuit card programming modules, the card programming rate can be quickly and easily altered.

The use of a plurality of integrated circuit card programming modules 250 in the modular system 300 provide added benefits as well. Often times, an integrated circuit on a card is programmed with different types of discrete information. For instance, the card can be programmed with user information, electronic purse information, debit information, etc. In addition, the time required to complete the programming of one type of information may be long, such that all of the stations 258 of the single cassette are full before programming is complete. If this occurs and only a single module and single cassette are used, the system must pause until programming of the first card is complete. The use of multiple modules alleviates this, because a plurality of modules can be assigned to perform similar programming tasks. Therefore, if a module that is assigned a programming task, such as performing electronic purse programming, is full and programming is not completed, the next cards can be transported to a second module that is also assigned the task of electronic purse programming. Additional modules performing a particular programming task can be added as needed in order to prevent pausing of the system. This concept of grouping modules that perform similar programming tasks increases card throughput.

In addition, the modules can be assigned different programming tasks. For instance, one module can be used to program user information onto a card, after which the card is transferred to the next module for electronic purse information programming. Likewise, after this programming is complete, the card is transferred to the next module for further card programming (if needed). Therefore, each module 250 can be assigned to handle a separate programming function, rather than the entire programming being performed by a single module.

During each operational cycle of the card programming module 250 in the modular system 300, the following five steps are performed:

1. Discharge card out to downstream module.
2. Receive card from upstream module.
3. Move card into an empty card processing station in the magazine.
4. Index magazine to the next card processing station from which a card is to be removed.
5. Exit card.

These five steps are repeated as detailed in Chart C, which lists a series of card cycles during the operation of two integrated circuit card programming modules, Module 1 and Module 2. Module 2 is adjacent to Module 1 downstream therefrom.

CHART C

| | | | Module 2 | | |
|---|---|---|---|---|---|
| Card Cycle | Step 1 Card Exited | Step 2 Card Entering | Step 3 Incoming Card Action | Step 4 Magazine Movement | Step 5 Card Moved to Exit |
| 0 | | | | | |
| 1 | None | None | None | None | None |
| 2 | None | None | None | None | None |
| 3 | None | None | None | None | None |
| 4 | None | None | None | None | None |
| 5 | None | None | None | None | None |
| 6 | None | None | None | None | None |
| 7 | None | None | None | None | None |
| 8 | None | None | None | None | None |
| 9 | None | None | None | None | None |
| 10 | None | None | None | None | None |
| 11 | None | None | None | Move to Station 1 | None |
| 12 | None | Card 11 | Place in Station 1 | Move to Station 2 | None |
| 13 | None | Card 12 | Place in Station 2 | Move to Station 3 | None |
| 14 | None | Card 13 | Place in Station 3 | Move to Station 4 | None |
| 15 | None | Card 14 | Place In Station 4 | Move to Station 5 | None |
| 16 | None | Card 15 | Place in Station 5 | Move to Station 6 | None |
| 17 | None | Card 16 | Place in Station 6 | Move to Station 7 | None |
| 18 | None | Card 17 | Place in Station 7 | Move to Station 8 | None |
| 19 | None | Card 18 | Place in Station 8 | Move to Station 9 | None |
| 20 | None | Card 19 | Place in Station 9 | Move to Station 10 | None |
| 21 | None | Card 20 | Place in Station 10 | Move to Station 11 | None |

| | | | Module 1 | | | CARD ARRIVES |
|---|---|---|---|---|---|---|
| Card Cycle | Step 1 Card Exited | Step 2 Card Entering | Step 3 Incoming Card Action | Step 4 Magazine Movement | Step 5 Card Moved To Exit | @ EXIT OF PREVIOUS MODULE |
| 0 | | | | Move to Station 1 | None | Card 1 |
| 1 | None | Card 1 | Place in Station 1 | Move to Station 2 | None | Card 2 |
| 2 | None | Card 2 | Place in Station 2 | Move to Station 3 | None | Card 3 |
| 3 | None | Card 3 | Place in Station 3 | Move to Station 4 | None | Card 4 |
| 4 | None | Card 4 | Place in Station 4 | Move to Station 5 | None | Card 5 |
| 5 | None | Card 5 | Place in Station 5 | Move to Station 6 | None | Card 6 |

CHART C-continued

| | | | | | | |
|---|---|---|---|---|---|---|
| 6 | None | Card 6 | Place in Station 6 | Move to Station 7 | None | Card 7 |
| 7 | None | Card 7 | Place in Station 7 | Move to Station 8 | None | Card 8 |
| 8 | None | Card 8 | Place in Station 8 | Move to Station 9 | None | Card 9 |
| 9 | None | Card 9 | Place in Station 9 | Move to Station 10 | None | Card 10 |
| 10 | None | Card 10 | Place in Station 10 | Move to Station 11 | None | Card 11 |
| 11 | None | Card 11 | Passed to Exit | Stay at Station 11 | Card 11 | Card 12 |
| 12 | Card 11 | Card 12 | Passed to Exit | Stay at Station 11 | Card 12 | Card 13 |
| 13 | Card 12 | Card 13 | Passed to Exit | Stay at Station 11 | Card 13 | Card 14 |
| 14 | Card 13 | Card 14 | Passed to Exit | Stay at Station 11 | Card 14 | Card 15 |
| 15 | Card 14 | Card 15 | Passed to Exit | Stay at Station 11 | Card 15 | Card 16 |
| 16 | Card 15 | Card 16 | Passed to Exit | Stay at Station 11 | Card 16 | Card 17 |
| 17 | Card 16 | Card 17 | Passed to Exit | Stay at Station 11 | Card 17 | Card 18 |
| 18 | Card 17 | Card 18 | Passed to Exit | Stay at Station 11 | Card 18 | Card 19 |
| 19 | Card 18 | Card 19 | Passed to Exit | Stay at Station 11 | Card 19 | Card 20 |
| 20 | Card 19 | Card 20 | Passed to Exit | Stay at Station 11 | Card 20 | Card 21 |
| 21 | Card 20 | Card 21 | Place in Station 11 | Move to Station 1 | Card 1 | Card 22 |

In each of the integrated circuit card programming modules described herein, the cards to be programmed, as well as cards that will not be programmed, pass through the magazine, either by passing through the pass-through slot 64 or by passing through a card programming station. By passing the cards through the magazine, instead of bypassing the cards around the magazine, the construction of the module is simplified and the size of the module is reduced.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A card production system comprising:
   a plurality of modules, at least two of said plurality of modules comprising first and second integrated circuit card programming modules, the first and second integrated circuit card programming modules each include:
   a card path;
   a card transport mechanism for transporting a card along the card path; and
   a plurality of integrated circuit card programming stations movable relative to the card path along an axis that is generally perpendicular to the card path;
   wherein the plurality of integrated circuit card programming stations of the first integrated circuit card programming module are movable relative to the plurality of integrated circuit card programming stations of the second integrated circuit card programming module along an axis that is generally perpendicular to the card path.

2. The card processing system according to claim 1, wherein said plurality of modules comprise at least one card handling module.

3. The card processing system according to claim 1, wherein said plurality of modules comprise at least one card processing module.

4. An integrated circuit card programming module, comprising:
   a housing;
   a linear card path through the housing;
   a card transport mechanism for transporting a card along the linear card path; and
   a mechanism movably mounted in the housing for movement along an axis generally perpendicular to the card path, the mechanism including a plurality of card programming stations mounted thereon and movable therewith along the axis and a pass-through location through which a card is able to pass without programming.

5. The module according to claim 4, wherein said pass-through location comprises one of said card programming stations.

6. The module according to claim 4, wherein said pass-through location comprises a pass-through slot.

7. A card production method, comprising:
   providing a plurality of modules, at least two of said plurality of modules comprising first and second integrated circuit card programming modules, the first and second integrated circuit card programming modules each include:
   a card path;
   a card transport mechanism for transporting a card along the card path; and
   a plurality of integrated circuit card programming stations movable along an axis that is generally perpendicular to the card path;
   inputting an integrated circuit card into the first integrated circuit card programming module;
   transporting the integrated circuit card along the card path and inserting the card into one of the integrated circuit card programming stations of the first integrated circuit card programming module;
   programming the integrated circuit card using the integrated circuit card programming station into which it is inserted; and
   inputting the integrated circuit card into the second integrated circuit card programming module.

8. A method of programming an integrated circuit card, comprising:
   (a) providing an integrated circuit card programming module that includes:
   a card path; a card transport mechanism for transporting a card along the card path; and a plurality of integrated circuit card programming stations movable along an axis that is generally perpendicular to the card path; and
   (b) moving the integrated circuit card programming stations relative to the card path while non-consecutively loading integrated circuit cards into the card programming stations for subsequent programming.

9. The method according to claim 8, wherein non-consecutively loading comprises loading the integrated circuit cards into every other one of the card programming stations while the card programming stations are moving in a first direction, and loading the integrated circuit cards into the card programming stations that were not loaded during the movement in the first direction while the card programming stations are moving in a second direction.

10. A method of programming integrated circuit cards each of which includes an integrated circuit, comprising:

providing a plurality of integrated circuit card programming modules, each said module including a plurality of integrated circuit card programming stations for programming an integrated circuit on an integrated circuit card;

using at least two of said modules to perform first programming tasks on the integrated circuits of a plurality of integrated circuit cards, and the first programming tasks performed on the integrated circuits in said at least two modules are similar; and using at least one other of said modules to perform a second programming task that is different from the first programming tasks.

11. A method of programming integrated circuit cards each of which includes an integrated circuit, comprising:

providing a plurality of integrated circuit card programming modules, each said module including a plurality of integrated circuit card programming stations for programming an integrated circuit on an integrated circuit card; and using at least two of said modules to perform first programming tasks on the integrated circuits of a plurality of integrated circuit cards, and the first programming tasks performed on the integrated circuits in said at least two modules are similar;

wherein the programming stations of one of said two modules are filled prior to any cards entering the second of said two modules.

12. A method of operating a card production system, the card production system comprising a first and a second integrated circuit card programming module, wherein the second integrated circuit card programming module is located downstream of the first integrated circuit card programming module, each said module including a plurality of integrated circuit card programming stations for programming integrated circuits on a plurality of integrated circuit cards and a pass-through location through which a card is able to pass without programming, comprising at least one of the following:

transporting a programmed integrated circuit card through the second integrated circuit card programming module using the pass-through location of the second integrated circuit card programming module, and transporting an integrated circuit card into the second integrated circuit card programming module using the pass-through location of the first integrated circuit card programming module.

* * * * *